United States Patent

[11] 3,619,476

| [72] | Inventor | Harry R. Rasmussen<br>422 Fife Heights Drive N.E., Tacoma, Wash. 98422 |
|---|---|---|
| [21] | Appl. No. | 7,612 |
| [22] | Filed | Feb. 2, 1970 |
| [45] | Patented | Nov. 9, 1971 |

[54] WALL OUTLET RECEPTACLE
3 Claims, 6 Drawing Figs.

[52] U.S. Cl. .................................................. 174/58,
174/53, 220/3.4
[51] Int. Cl. .................................................. H02g 3/12
[50] Field of Search .......................................... 220/3.9,
3.2, 3.3, 3.4, 3.5, 3.6, 3.8, 3.92; 174/58, 53, 48, 49

[56] References Cited

UNITED STATES PATENTS

| Re 25,593 | 6/1964 | Palmer | 220/3.9 |
| 982,193 | 1/1911 | Thayer | 220/3.4 |
| 1,133,946 | 3/1915 | Farrell | 220/3.4 |
| 2,740,873 | 4/1956 | Crank | 220/24.2 UX |
| 3,052,955 | 9/1962 | McAndrews et al. | 29/525 X |

Primary Examiner—Lewis H. Myers
Assistant Examiner—D. A. Tone
Attorney—Ford E. Smith

ABSTRACT: A molded-polymer outlet receptacle for low-voltage electrical and communication systems has L-shaped structure to embrace and be secured to a structural element of a wall. An apertured plate is cantilevered into space from said L-shaped structure, and buttress means therebetween stiffens and strengthens the assembly. Instanding ears in said plate variously receive and secure an escutcheon, and on occasion electric connector components.

PATENTED NOV 9 1971 3,619,476
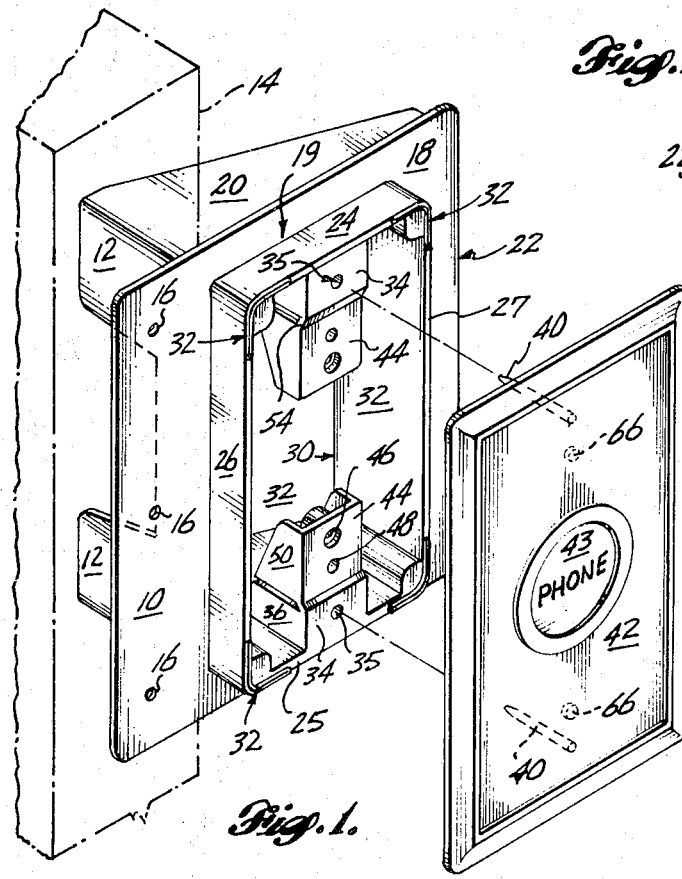
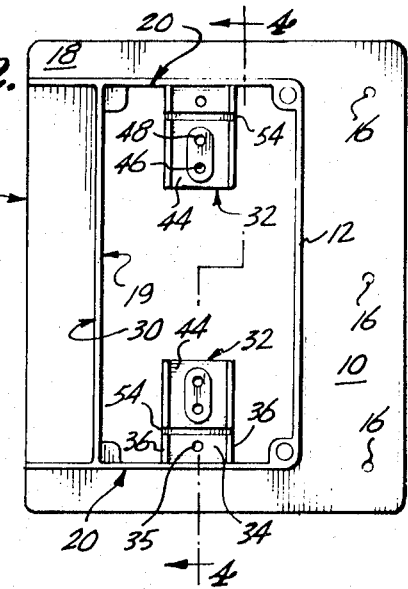
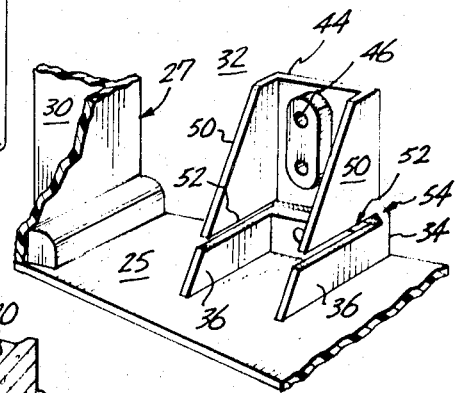
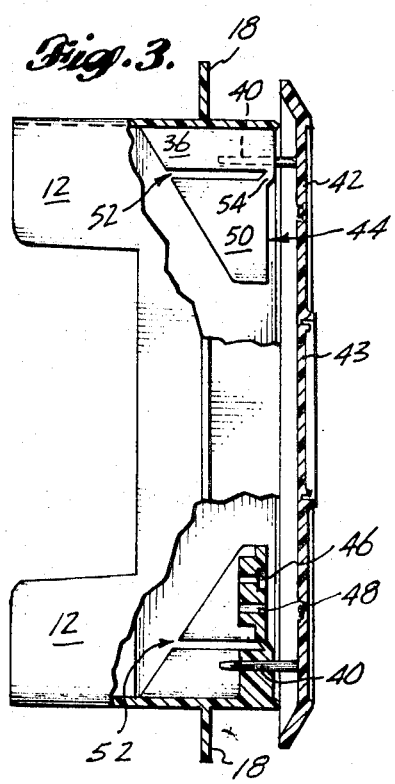
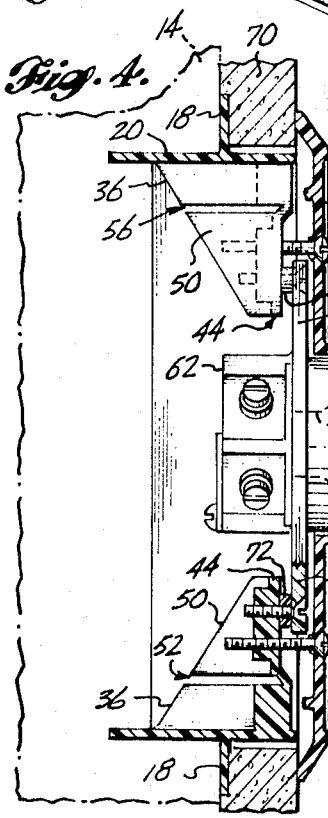
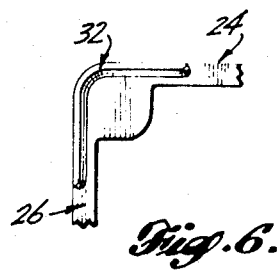
INVENTOR
HARRY R. RASMUSSEN
BY Ford E. Smith
ATTORNEY

WALL OUTLET RECEPTACLE

SUMMARY OF THE INVENTION

It has become common practice for telephone companies to install numerous outlets and service conductors particularly in new construction, even though there is no immediate intention to use such installations. These outlets are closed with blank covers or escutcheons, while the outlets remain unused until it becomes desirable to activate service. There is thus a need for an inexpensive strong outlet receptacle that may easily be simply installed, prior to the closure of the wall, and which is rugged to withstand the rigors of wall covering and closing, and subsequent modification to house electrical equipment. Prior efforts in this direction have included the use of metal stampings. These, however, have been unduly expensive, have low strength characteristics, and fail to fully serve the purposes of such installations.

DESCRIPTION OF THE DRAWINGS

FIG. 1 is an exploded perspective view of the outlet receptacle and escutcheon;

FIG. 2 is a rear elevation of the receptacle;

FIG. 3 is a side elevation of the receptacle and escutcheon in partial vertical section for illustrative purposes;

FIG. 4 is a vertical section of the outlet having an electrical component installed, taken along line 4—4 of FIG. 2;

FIG. 5 is a fragmentary view of perspective of a mounting boss in the receptacle; and FIG. 6 is a face view detailing a front corner feature of the receptacle.

DESCRIPTION OF THE INVENTION

The receptacle, shown best in FIGS. 1 and 2, has a front flange 10 and a sidewall 12 at right angles thereto and comprising L-shaped structure to embrace a structural element 14 of a building wall. Flange 10 is secured to the face of element 14, which may be a conventional builder's stud by nails or other fasteners inserted through holes 16.

Extending in cantilevered fashion from the L-shaped structure and coplanar with flange 10 is plate 18 which is apertured to provide access into the receptacle. The outward extending plate 18 is supported relative to sidewall 12 by transverse buttress walls 20, 20 which extend to the remote edge 22 of plate 18. The opening in plate 18 is framed and enclosed by outstanding end walls 24,25 and sidewalls 26,27 which are joined to form a collar extending forward of the plane of plate 18. Walls 24, 25 are preferably coplanar with buttress walls 20,20. Likewise, walls 26,27 are respectively coplanar with sidewall 12 and the opposite rearward directed wall 30 which extends between buttresses 20,20.

From the foregoing, it will be seen that a mouth to the receptacle is defined by walls 24, 25, 26, and 27, that the lips of said mouth lie forwardly offset from flange 10 and plate 18, and that rearward of said mouth is space enclosed by sidewall 12, buttress walls 20,20 and inner wall extension 30. In low-voltage systems, the receptacle may be backless as shown.

Desirably this structure is molded of polymeric material, such as of polypropylene, expoxide, or comparable light, strong and relatively inexpensive materials. It has been found that a receptacle as described molded of polypropylene wherein wall thicknesses throughout were one-sixteenth inch, flange 10 was 1⅛inches wide and 4 11/16 inches long, and the buttressed plate 18 extended 2 11/16 inches from sidewall 12, would easily support approximately 175 pounds when, with but two nails, flange 10 was secured to a rigid support, wall 18 extending horizontally outward. It is thus demonstratable that despite the extreme lightness of structure, the buttressed assembly has surprising rigidity and ruggedness. These factors are highly desireable since outlets of this nature are installed in wall structures before the wall construction is completed and covering panels are installed during which time there is the likelihood that substantial and unusual forces may be applied to the outlet. The collar formed by walls 24, 25, 26, and 27 stands forward of plate 18 approximately the thickness of a dry-wall or plasterboard panel 70 which may be one-half or five-eigths inch in thickness.

To facilitate imprint marking of such a panel for cutting to provide an opening to embrace the collar, the junctions of the walls 24–27 are curved and provided with sharp-edged ribs or ridges 32. With the panel 70 pressed to the mouth of the outlet, the installer sharply raps the panel 70 in the vicinity of the outlet, and the backside of the panel is indented to accurately indicate where the outlet aperture is to be cut.

An opposed pair of ears 32,32 instand at the mouth of the receptacle as shown in FIGS. 1, 3, and 4. Each ear comprises a base 34 braced by rear arms 36,36 arranged in U-shape and integral with an end wall 24 or 25. Each base 34 has an opening 35 forming a spaced-apart pair of openings to receive pins 40,40 of escutcheon 42. Each ear 32 has a wall 44 instanding relative base 34 and provided with paired opening 46 and 48. At the backside, walls 50,50 stand to the rear of wall 44, overlie walls 36,36 and provide support and stiffening. Walls 36,36 are separated from walls 50,50 by slots 52,52 and thereby are resiliently joined to bases 34. Walls 44 may be removed by fracturing or tearing the webs 54,54. Bosses 56,56 are provided on the rear of walls 44,44 to stiffen then and provide depth for holes 46 and 48 formed therein.

When the outlet has been installed in a wall and the wall covered and finished, the escutcheon 42 is installed by pressing the pins 40,40 into holes 35,35 which snugly receive the pins. Escutcheon 42 has a knock-out disc 43 which is removed and discarded when an electrical component as 60 shown in fig. 4 is to be installed. The electric component 60 may typically be a connector body 62 having a female opening 64 to receive a jack plug or the like. It is attached to ears 32,32 by screws 66,66 passed through flanges 64,64 on body 62, and inserted into holes 46,46. When suitable conductor connections have been made, and the receptacle is to be recovered, the escutcheon may be again secured by pins 40,40. Or weakened area 66,66 in escutcheon 42 may be pierced and screws 68,68 inserted into holes 48,48. To accommodate various thicknesses of panels 70, spacer collars 72 may be inserted between the ears 64 on component 60 and ears 32 of the receptacle. This sets body 62 outward the thickness of the collars 72.

The slots 52 in ears 32 not only facilitate removal of portions of the ears, but also permits the ears to be drawn resiliently forward as when screws 68 are used with escutcheon 42 to pull component 62 forward into close contact with the rear of the escutcheon. Slots 52 also permit limit amount of rearward displacement of ears 32 when pressure is applied in that direction.

It will be apparent that this invention is disclosed in a preferred manner. Those skilled in the art will readily recognize that alternative arrangements of structure and modifications may be made. All such as, by an appropriate application of the doctrine of equivalents, fall within the scope and spirit of the subjoined claims is intended to be covered by this patent.

What is claimed is:

1. An inexpensive molded-polymer outlet receptacle for low-voltage electrical systems, comprising:
   L-shaped structure to embrace and be secured to a corner of a structural element of a wall;
   a plate cantilevered from said L-shaped structure to be disposed substantially coplanar with the face of a wall receiving said receptacle;
   buttress means at the rear of said plate connecting between said plate and said L-shaped structure;
   said plate having an outlet aperture; and
   an opposed pair of instanding ears at said aperture adapted to receive and support an electric fixture and an escutcheon.

2. Apparatus according to claim 1 in which there is an outstanding collar about said aperture and said ears are buttress-supported on inner surfaces of said collar.

3. A receptacle according to claim 1 including:

a flexible, nonmetallic escutcheon plate and closing the mouth of said receptacle, said plate having integral instanding studs on its backside received by said bosses.

* * * * *